US010830365B2

(12) United States Patent
Pandian et al.

(10) Patent No.: US 10,830,365 B2
(45) Date of Patent: Nov. 10, 2020

(54) BI-DIRECTIONAL INLINE CHECK VALVE

(71) Applicant: GOODRICH AEROSPACE SERVICES PRIVATE LIMITED, Bangalore (IN)

(72) Inventors: Navaneethakrishnan Pandian, Bangalore (IN); Vishnu Subramanian, Bangalore (IN); Rajasekaran Janakiraman, Doddanekundi (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 4 days.

(21) Appl. No.: 16/158,912

(22) Filed: Oct. 12, 2018

(65) Prior Publication Data

US 2019/0128436 A1 May 2, 2019

(30) Foreign Application Priority Data

Oct. 26, 2017 (IN) .............................. 201711038001

(51) Int. Cl.
| | |
|---|---|
| *F16K 17/26* | (2006.01) |
| *F16K 15/12* | (2006.01) |
| *F16K 15/02* | (2006.01) |
| *F16K 15/18* | (2006.01) |
| *F15B 13/01* | (2006.01) |
| *F15B 13/02* | (2006.01) |
| *F15B 15/20* | (2006.01) |

(52) U.S. Cl.
CPC .............. *F16K 15/12* (2013.01); *F15B 13/01* (2013.01); *F15B 13/027* (2013.01); *F16K 15/021* (2013.01); *F16K 15/025* (2013.01); *F16K 15/18* (2013.01); *F15B 15/204* (2013.01); *F15B 2211/4053* (2013.01); *Y10T 137/778* (2015.04); *Y10T 137/7777* (2015.04)

(58) Field of Classification Search
CPC ....... Y10T 137/7771–7779; Y10T 137/86694; Y10T 137/86791; F16K 17/196
USPC ........................................................... 91/468
See application file for complete search history.

(56) References Cited

U.S. PATENT DOCUMENTS

| | | | | |
|---|---|---|---|---|
| 3,153,423 A | * | 10/1964 | Biello | ................... F16K 17/196 |
| | | | | 137/493.5 |
| 3,665,810 A | | 5/1972 | Parrett | |
| 3,688,644 A | | 9/1972 | Cusveller | |
| 4,673,051 A | | 6/1987 | Darling | |
| 4,901,474 A | | 2/1990 | Bayard et al. | |

(Continued)

FOREIGN PATENT DOCUMENTS

KR 101061107 B1 8/2011

OTHER PUBLICATIONS

European Search Report for Applicaiton No. 182020347.7-1010, dated Apr. 4, 2019, 7 pages.

*Primary Examiner* — Robert K Arundale
(74) *Attorney, Agent, or Firm* — Cantor Colburn LLP

(57) ABSTRACT

A check valve includes a housing, a first valve, and a second valve. The housing has a first portion that defines a first chamber and a second portion that defines a second chamber. The first valve is disposed within and is movable relative to the housing. The second valve is at least partially extends into the first valve. Responsive to a fluid flow in a first direction, the second valve and the first valve moves towards a proximal end of the housing and the fluid flow flows around the first valve towards a component.

13 Claims, 4 Drawing Sheets

(56) References Cited

U.S. PATENT DOCUMENTS

| | | | | |
|---|---|---|---|---|
| 5,165,445 A | * | 11/1992 | Vertanen | F16K 17/196 |
| | | | | 137/493.6 |
| 5,240,027 A | * | 8/1993 | Vertanen | F16K 17/003 |
| | | | | 137/73 |
| 6,216,729 B1 | | 4/2001 | Hambly et al. | |
| 7,343,740 B2 | | 3/2008 | Sakai | |
| 9,470,285 B2 | | 10/2016 | Plude | |
| 2011/0226356 A1 | * | 9/2011 | Yamaguchi | B60K 15/03519 |
| | | | | 137/511 |
| 2014/0216573 A1 | * | 8/2014 | Yamaguchi | F02M 37/20 |
| | | | | 137/493.6 |
| 2017/0138493 A1 | * | 5/2017 | Yamaguchi | B60K 15/03519 |

* cited by examiner

BI-DIRECTIONAL INLINE CHECK VALVE

CROSS-REFERENCES TO RELATED APPLICATIONS

This patent application claims priority to Indian Provisional Patent Application Serial No. 201711038001, filed Oct. 26, 2017 which is incorporated herein by reference in its entirety.

STATEMENT REGARDING FEDERALLY SPONSORED RESEARCH OR DEVELOPMENT

None.

BACKGROUND

Exemplary embodiments pertain to the art of actuator assemblies.

A hydraulic actuator may be used to open and close a door or cowl of a gas turbine engine nacelle for ground maintenance purposes. The hydraulic actuator may be a single acting hydraulic actuator having an actuating rod. A surface irregularity on the bore or potential issues of the sealing may lead to oil leakage due to the intrusion of air into a hydraulic cylinder. Accordingly, it is desirable to provide a check valve capable of inhibiting leakage from the hydraulic cylinder.

BRIEF DESCRIPTION

Disclosed is a check valve that includes a housing, a first valve, and a second valve. The housing has a first portion that defines a first chamber and a second portion that defines a second chamber. The first valve is disposed within and is movable relative to the housing. The second valve is at least partially extends into the first valve. Responsive to a fluid flow in a first direction, the second valve and the first valve moves towards a proximal end of the housing and the fluid flow flows around the first valve towards a component.

In addition to one or more of the features described herein, responsive to the fluid flow in a second direction, the first valve moves away from the proximal housing and the second valve moves relative to the first valve to facilitate the fluid flow through the first valve and around the second valve towards a fluid source.

In addition to one or more of the features described herein, the first valve includes a valve body having a first head.

In addition to one or more of the features described herein, the second valve includes a push rod having a second head that at least partially extends into the first head and a second valve body.

In addition to one or more of the features described herein, a retaining member is disposed within the first chamber and defining a first spring seat.

In addition to one or more of the features described herein, a first biasing member that extends between the first head and the first spring seat.

In addition to one or more of the features described herein, a second biasing member that extends between the second head and the second valve body.

Also disclosed is a hydraulic system that includes an actuator assembly and a check valve. The actuator assembly has an actuator body and a piston assembly. The actuator body defines an actuator bore and a first bore. The piston assembly is disposed within the actuator bore. The check valve is connected to the actuator body, an housing, and a first valve. The housing has a first portion and a second portion that extends from the first portion and into the first bore. The first portion defines a first chamber and the second portion defines a second chamber. The first valve includes a valve body that extends through the first chamber and the second chamber and has a first head.

In addition to one or more of the features described herein, the actuator body defines a second bore and a transition bore that extends between the first bore and the second bore.

In addition to one or more of the features described herein, the first head extends into the transition bore and selectively engages a first valve seat that is defined by the transition bore.

In addition to one or more of the features described herein, the first valve further includes a biasing member that extends between the first head and a first spring seat disposed within the first chamber to bias the first head towards engagement with the first valve seat.

In addition to one or more of the features described herein, the valve body defines a first passage that extends through the valve body.

In addition to one or more of the features described herein, the check valve assembly further includes a second valve including a push rod that extends into the second bore, the push rod having a second head that extends into the first passage.

In addition to one or more of the features described herein, the second valve further includes a second valve body defining a second passage within which the push rod at least partially extends.

In addition to one or more of the features described herein, the first valve further comprising a flow restriction element disposed within the first passage.

In addition to one or more of the features described herein, the second valve further includes a second biasing member that extends between the second head and the second valve body to bias the second head towards engagement with the first head.

In addition to one or more of the features described herein, the actuator body defines a first port that is fluidly connected to the first bore.

In addition to one or more of the features described herein, the actuator body defines a second port that is fluidly connected to the second bore.

In addition to one or more of the features described herein, responsive to a fluid flow being provided through the second port, the push rod and the valve body moves toward a proximal end of the housing such that the first head is spaced apart from the first valve seat to facilitate fluid flow through the transition bore and into the first port.

In addition to one or more of the features described herein, responsive to a fluid flow being provided through the first port, the fluid flow flows through the second chamber, the first chamber, and through the flow restriction element and the push rod moves relative to the second valve body such that the second head becomes spaced apart from the first head to facilitate the fluid flow to flow between the first head and the second head and through the second port.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
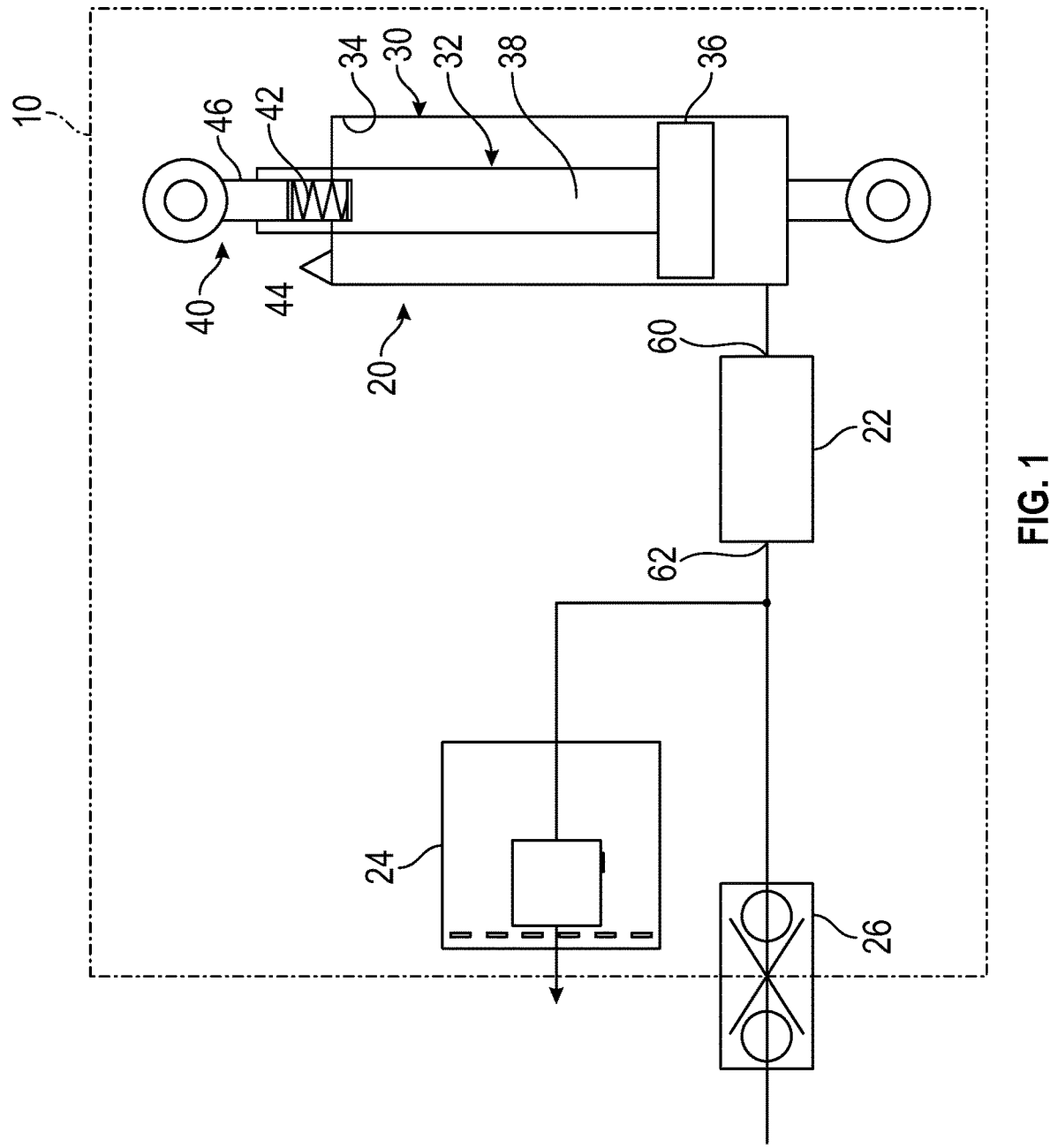
FIG. 1 is schematic of a hydraulic system for a door opening system.

Referring to FIG. 1, a hydraulic system 10 for a door opening system is shown. The door opening system is a stand-alone system that is arranged to open and close a door, cowl, or other type of panel of a nacelle of a gas turbine engine to facilitate ground maintenance. The hydraulic system 10 includes an actuator assembly 20, a check valve 22, a pressure relief valve 24, and a quick disconnect 26. The check valve 22, the pressure relief valve 24, and the quick disconnect 26 may all be integrated with the actuator assembly 20 such that it may be provided as a single actuator unit.

The actuator assembly 20 may be a hydraulic actuator having an actuator body 30 and a piston assembly 32 that is movably disposed within the actuator body 30. The actuator body 30 may define an actuator bore 34 that extends along an axis. The piston assembly 32 is movably disposed within the actuator bore 34.

The piston assembly 32 includes a piston head 36 and a piston rod 38 extending from piston head 36 along the axis. The piston rod 38 receives a lost motion device 40 that is located opposite the piston head 36. The lost motion device 40 includes a biasing member 42 that is disposed within a cavity 44 that is defined by the piston rod 38 and a connecting member 46 that is at least partially received within the cavity 44 and engages the biasing member 42. The connecting member 46 operatively connects the actuator assembly 20 to a door, cowl, or other type of panel to be moved for ground maintenance.

Figure 2:
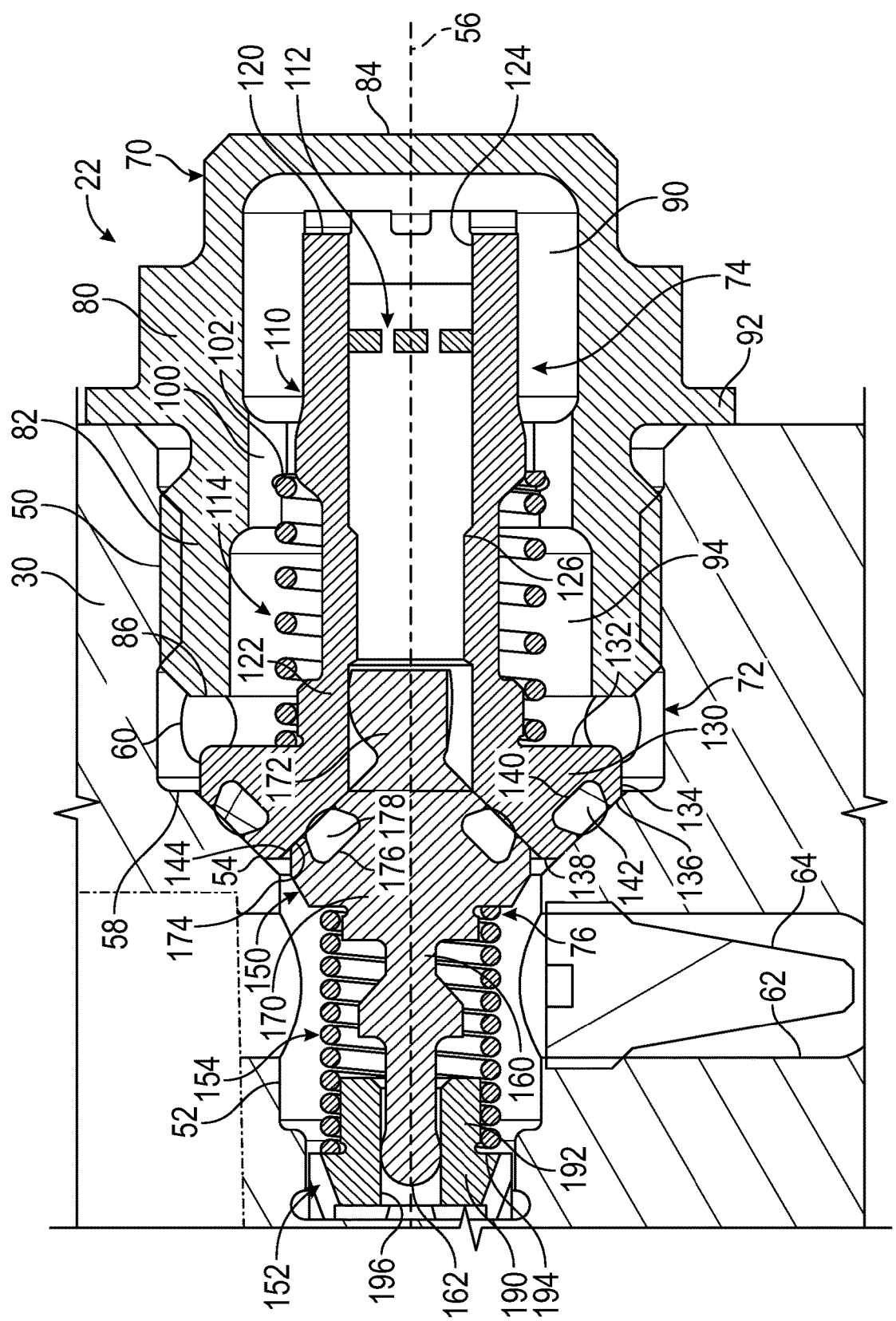
FIG. 2 is a cross-sectional view of a check valve provided with an actuator assembly of the hydraulic system.

Referring to FIG. 2, the actuator body 30 further defines a first bore 50, a second bore 52, and a transition bore 54. The first bore 50 extends along an axis 56 that is disposed transverse to the axis along which the actuator bore 34 extends. The first bore 50 extends towards the actuator bore 34. The first bore 50 has a first bore diameter. The second bore 52 extends along the axis 56 and is spaced apart from the first bore 50 by the transition bore 54. The second bore 52 has a second bore diameter that is less than the first bore diameter. The transition bore 54 extends between the first bore 50 and the second bore 52 along the axis 56. The transition bore 54 defines a first valve seat. In at least one embodiment, an end wall 58 extends between the first bore 50 and the transition bore 54. The end wall 58 is disposed substantially perpendicular to the first bore 50 and the axis 56.

The actuator body 30 also defines a first port 60 and a second port 62. In at least one embodiment, the check valve 22 itself may define the first port 60 and the second port 62. The first port 60 is fluidly connected to the first bore 50 and is disposed proximate the end wall 58 and the transition bore 54. The first port 60 enables fluid flow into or from the actuator bore 34. The second port 62 is fluidly connected to the second bore 52. The second port 62 enables fluid flow from a ground service cart to the actuator assembly 20. In at least one embodiment, a safety screen or screen element 64 is disposed within the second port 62.

The check valve 22 is connected to the actuator body 30 and extends into the first bore 50 and the second bore 52. The check valve 22 is arranged as a bi-directional check valve that facilitates a fluid flow in at least a first direction and a second direction. The check valve 22 includes an end cover or a housing 70, a cap 72, a first valve 74, and a second valve 76.

The housing 70 is disposed adjacent to the cap 72 and at least partially extends through the cap 72. The housing 70 includes a first portion 80 and a second portion 82 that extends between a proximal end 84 of the housing 70 and a distal end 86 of the housing 70 along the axis 56.

The first portion 80 extends from the proximal end 84 of the housing 70 towards the second portion 82 along the axis 56. The first portion 80 is spaced apart from the first bore 50 and defines a first chamber 90. The first portion 80 includes a flange 92 that engages an external surface of the actuator body 30.

The second portion 82 extends from the first portion 80 and extends along the axis 56 towards the distal end 86. The second portion 82 extends into the first bore 50 and may sealingly engage the first bore 50. The second portion 82 may define a sealing groove that is arranged to receive a seal that engages the first bore 50. The second portion 82 defines a second chamber 94.

At least one of the housing 70 or the first valve 74 is provided with a retaining member 100 that is disposed within the first chamber 90 of the first portion 80 of the housing 70. The retaining member 100 defines a central opening through which at least a portion of the first valve 74. The retaining member 100 defines a first spring seat 102.

The cap 72 is disposed within the first bore 50 proximate the distal end 86 of the housing 70 and abuts the end wall 58. The cap 72 may be a threaded cap that engages threads that are defined by the first bore 50 proximate the end wall 58 to secure the cap 72 within the first bore 50. The cap 72 defines at least one opening that is aligned with the first port 60.

The first valve 74 is disposed within the housing 70 and is disposed within the first bore 50 and the transition bore 54. The first valve 74 includes a valve body 110, a flow restriction element 112, and a first biasing member 114.

The valve body 110 extends through the first chamber 90 of the first portion 80 and the second chamber 94 of the second portion 82 of the housing 70 along the axis 56. The valve body 110 is a generally elongate body that extends between a valve body first end 120 and a valve body second end 122. The valve body 110 may have a first body diameter proximate the valve body first end 120 and a second body diameter proximate but spaced apart from the valve body second end 122 that is less than the first body diameter.

The valve body 110 defines a first passage 124 that extends from the valve body first end 120 to the valve body second end 122. A first shoulder 126 is defined within the first passage 124 and is disposed between the valve body first end 120 and the valve body second end 122.

The valve body 110 includes a first head 130 that is disposed at and extends from the valve body second end 122. The first head 130 is spaced apart from the distal end 86 of the housing 70 and extends into the transition bore 54. The first head 130 is an enlarged head having a first head diameter that is greater than the first body diameter and the second body diameter.

The first head 130 includes an aft surface 132, a side surface 134, a tapered surface 136, and a forward surface 138. The aft surface 132 faces towards and is disposed substantially parallel to the distal end 86 of the housing 70. The aft surface 132 is disposed substantially parallel to the first spring seat 102 of the retaining member 100. The side surface 134 extends between the aft surface 132 and the tapered surface 136. The side surface 134 is disposed substantially parallel to the first bore 50 and the valve body 110. The tapered surface 136 extends between and is disposed in a non-perpendicular and non-parallel relationship with the side surface 134 and the forward surface 138. The tapered surface 136 is disposed at an angle that is complementary to first valve seat that is defined by the transition bore 54. The tapered surface 136 defines a first seal opening 140 that receives a first sealing member 142. The tapered surface 136 and the first sealing member 142 selectively engage the first valve seat that is defined by the transition bore 54. The forward surface 138 is disposed generally parallel to the aft surface 132.

The first head 130 defines a tapered receiving region 144 that extends from the forward surface 138 towards the aft surface 132. The tapered receiving region 144 extends to the first passage 124 and defines a second valve seat. In at least one embodiment, the second valve seat is arranged as a conical valve seat.

The flow restriction element 112 is disposed within the first passage 124. The flow restriction element 112 engages the first shoulder 126 to seat the flow restriction element 112 within the first passage 124 of the valve body 110. The flow restriction element 112 may be a member, such as a disc, that defines at least one orifice sized to restrict flow through the first passage 124. In the embodiments shown in FIGS. 2-4, the flow restriction element includes two orifices such that the flow restriction element 112 is arranged to inhibit a fluid flow through the first passage 124 when the fluid flow flows in a first direction and facilitate a fluid flow through the first passage 124 when the fluid flow flows in a second direction.

The first biasing member 114 extends between the first head 130 and the retaining member 100. The first biasing member 114 engages the aft surface 132 of the first head 130 and the first spring seat 102 of the retaining member 100 to bias the tapered surface 136 of the first head 130 towards engagement with the first valve seat.

The second valve 76 is disposed in line with the first valve 74 such that the second valve 76 is at least partially received within the first valve 74. The second valve 76 is disposed within the transition bore 54 and the second bore 52. The second valve 76 includes a push rod 150, a second valve body 152, and a second biasing member 154.

The push rod 150 extends between a push rod first end 160 and a push rod second end 162 along the axis 56. The push rod second end 162 extends at least partially into the second valve body 152. The push rod 150 includes a second head 170 and an extension 172 that is disposed at the push rod second end 162. The second head 170 is configured as a tapered head having tapered side surfaces 174. The second head 170 is arranged as a conical head that selectively engages the conical valve seat. The tapered side surfaces 174 define a second seal opening 176 that receives a second sealing member 178. The tapered side surfaces 174 and the second sealing member 178 selectively engage the second valve seat that is defined by the tapered receiving region 144.

The second head 170 is received by the tapered receiving region 144 of the first head 130. The extension 172 extends from the second head 170 and extends into the first passage 124. The extension 172 may be configured as a bulbous member that is movably disposed within the first passage 124.

The second valve body 152 includes an enlarged head 190 and a body 192 that extends from the enlarged head along the axis 56. The enlarged head 190 has an enlarged head diameter that is less than the first head diameter. The enlarged head 190 defines a second spring seat 194 that is disposed perpendicular to the body 192. The second valve body 152 defines a second passage 196 that extends through the enlarged head 190 and the body 192 along the axis 56. A portion of the push rod second end 162 is at least partially received within the second passage 196.

The second biasing member 154 extends between the second head 170 and the second valve body 152. The second biasing member 154 is disposed about the body 192 and engages the second head 170 and the second spring seat 194. The second biasing member 154 biases the tapered side surface 174 of the second head 170 towards engagement with the second valve seat that is defined by the tapered receiving region 144 of the first head 130.

Figure 3:
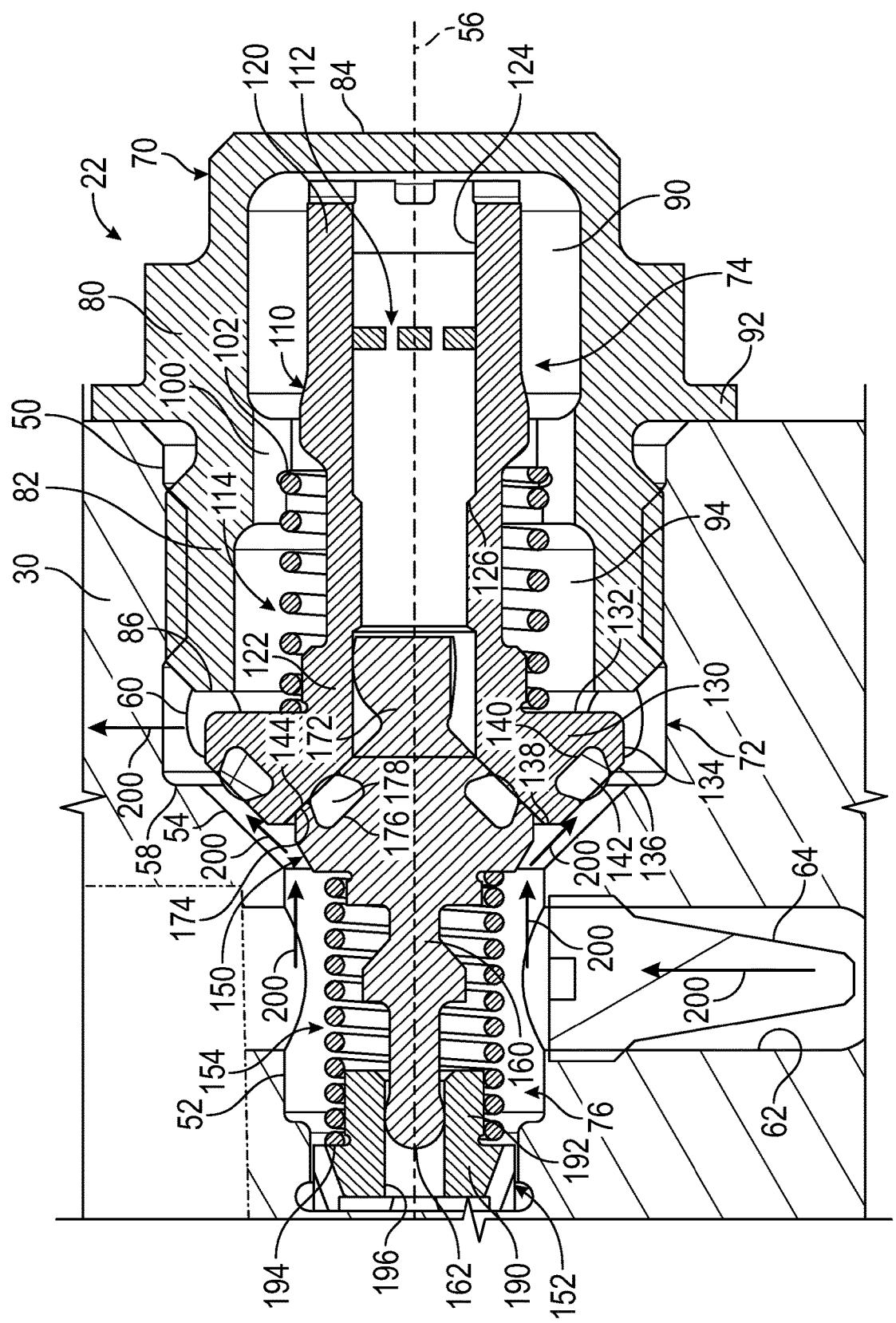
FIG. 3 is a cross-sectional view of the check valve while receiving a fluid flow from a ground service cart.

Referring to FIG. 3, a ground service cart may provide a fluid flow 200 to the hydraulic system 10 through the quick disconnect 26. The fluid flow 200 may flow in a first direction through the second port 62, through the screen element 64, and flow into the second bore 52. Should the fluid flow 200 overcome the cracking pressure or the biasing force provided by the first biasing member 114, the valve body 110 of the first valve 74 and the push rod 150 of the second valve 76 both move along the axis 56 towards the proximal end 84 of the housing 70. The movement of the valve body 110 and the push rod 150 along the axis 56 towards the proximal end 84 of the housing 70 and spaces the tapered surface 136 of the first head 130 of the valve body 110 of the first valve 74 apart from the first valve seat that is defined by the transition bore 54 to enable the fluid flow 200 to flow through or between the transition bore 54 and the tapered surface 136 (e.g. around the second valve 76 and around the first valve 74) and into the first port 60 towards a component. The fluid flow 200 flows into the first port 60 and then flows into the actuator bore 34 to move the piston assembly 32 to stroke the actuator assembly 20.

Figure 4:
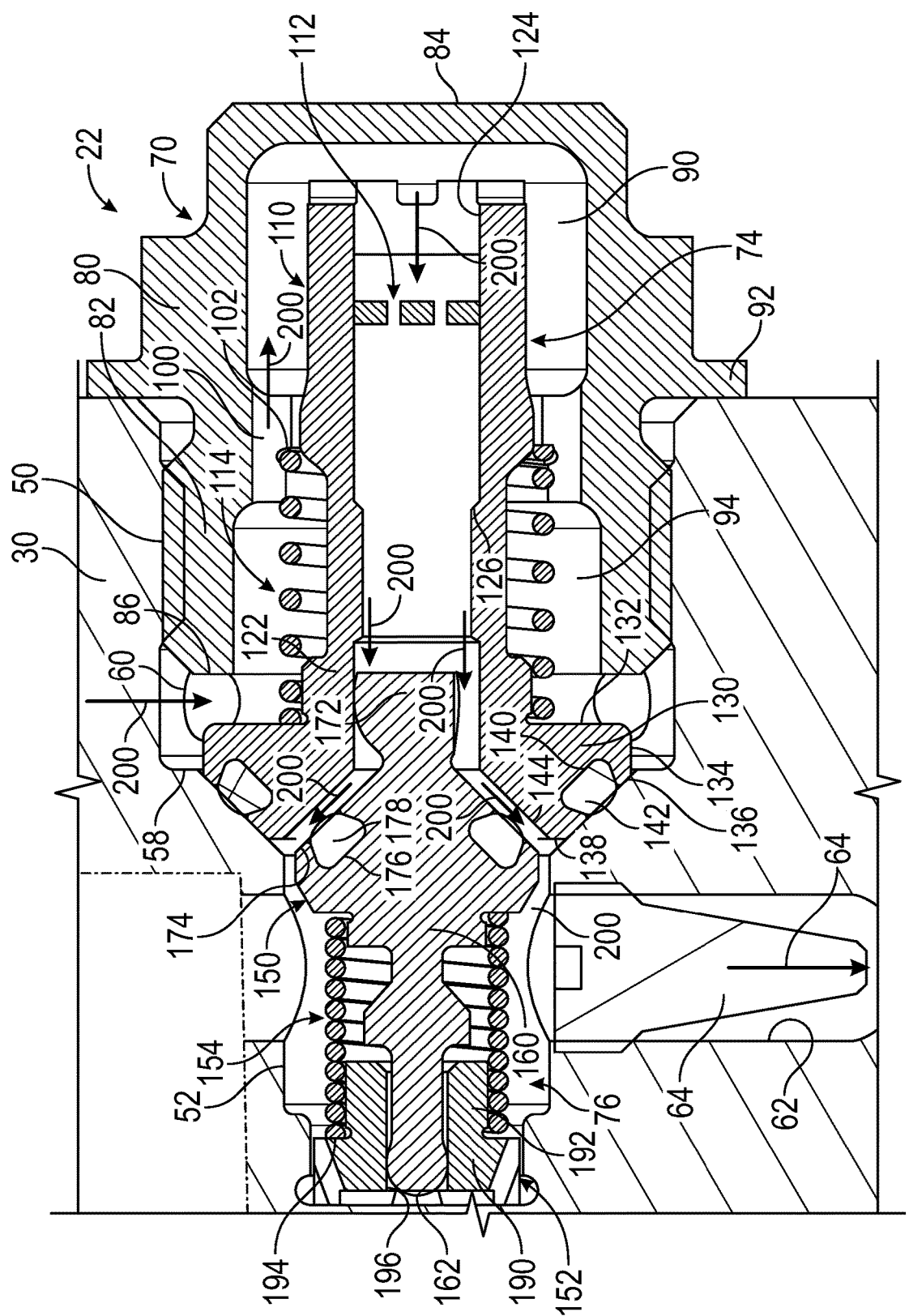
FIG. 4 is a cross-sectional view of the check valve while releasing a fluid flow to the ground service cart.

Referring to FIG. 4, responsive to the release of the fluid flow 200 from within the actuator body 30 of the actuator assembly 20, the fluid flow 200 may flow in a second direction through the first port 60 and flows into at least one of the second chamber 94 or the first chamber 90 of the housing 70. Should the fluid flow 200 overcome the cracking pressure or the biasing force of the second biasing member 154, the fluid flow 200 and/or the first biasing member 114 moves the tapered surface 136 of the first head 130 of the valve body 110 of the first valve 74 away from the proximal end 84 of the housing 70 and away from the distal end 86 of the housing 70 towards engagement with the first valve seat that is defined by the transition bore 54. The fluid flow 200 flows through at least one of the second chamber 94 or the first chamber 90 and flows through the first passage 124 of the first valve 74 and the flow restriction element 112 enables the fluid flow 200 to flow through the first passage 124 and moves the second head 170 of the second valve 76 relative to the first head 130 of the first valve 74 such that the tapered side surface 174 of the second head 170 of the push rod 150 becomes spaced apart from the second valve seat of the tapered receiving region 144 of the first head 130 of the valve body 110 of the first valve 74 to facilitate the fluid flow 200 to flow through the first valve 74 and between the first head 130 and the second head 170 (e.g. around the second valve 76) and into the second port 62 towards a fluid source, e.g. the ground service cart. The fluid flow 200 flows into the second port 62, through the screen element 64, and then flows through the quick disconnect 26 and back to the ground service cart.

The in-line arrangement between the first valve 74 and the second valve 76 of the check valve 22 minimizes the packaging envelope of the check valve 22 and enables a more efficient removal of air from a fluid that may be within the actuator body 30 to inhibit leakage of the fluid from the actuator assembly 20. Furthermore, the check valve 22 enables the in-line arrangement of the check valve 22 with other components of the hydraulic system 10 such as the quick disconnect 26 and/or the pressure relief valve 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydraulic system, comprising:
    an actuator assembly having:
        an actuator body defining an actuator bore and a first bore, and
        a piston assembly disposed within the actuator bore; and
    a check valve connected to the actuator body, the check valve, comprising:
        a housing having a first portion and a second portion extending from the first portions and extends into the first bore, the first portion defining a first chamber and the second portion defining a second chamber, and
        a first valve including a valve body that extends through the first chamber and the second chamber and having a first head.

2. The hydraulic system of claim 1, wherein the actuator body defines a second bore and a transition bore that extends between the first bore and the second bore.

3. The hydraulic system of claim 2, wherein the first head extends into the transition bore and selectively engages a first valve seat that is defined by the transition bore.

4. The hydraulic system of claim 3, wherein the first valve further includes a biasing member that extends between the first head and a first spring seat disposed within the first chamber to bias the first head towards engagement with the first valve seat.

5. The hydraulic system of claim 3, wherein the valve body defines a first passage that extends through the valve body.

6. The hydraulic system of claim 5, wherein the check valve further comprising:
    a second valve including a push rod that extends into the second bore, the push rod having a second head that extends into the first passage.

7. The hydraulic system of claim 6, wherein the second valve further includes a second valve body defining a second passage within which the push rod at least partially extends.

8. The hydraulic system of claim 7, wherein the first valve further comprising a flow restriction element disposed within the first passage.

9. The hydraulic system of claim 8, wherein the second valve further includes a second biasing member that extends between the second head and the second valve body to bias the second head towards engagement with the first head.

10. The hydraulic system of claim 9, wherein the actuator body defines a first port that is fluidly connected to the first bore.

11. The hydraulic system of claim 10, wherein the actuator body defines a second port that is fluidly connected to the second bore.

12. The hydraulic system of claim 11, wherein responsive to a fluid flow being provided through the second port, the push rod and the valve body moves toward a proximal end of the housing such that the first head is spaced apart from the first valve seat to facilitate fluid flow through the transition bore and into the first port.

13. The hydraulic system of claim 11, wherein responsive to a fluid flow being provided through the first port, the fluid flow flows through the second chamber, the first chamber, and through the flow restriction element and the push rod moves relative to the second valve body such that the second head becomes spaced apart from the first head to facilitate the fluid flow to flow between the first head and the second head and through the second port.

* * * * *